US 8,145,412 B2

(12) United States Patent
Akimoto (10) Patent No.: US 8,145,412 B2
(45) Date of Patent: Mar. 27, 2012

(54) INTERNAL COMBUSTION ENGINE SYSTEM, VEHICLE HAVING THE INTERNAL COMBUSTION ENGINE SYSTEM, AND ENGINE MISFIRE DETECTION METHOD FOR INTERNAL COMBUSTION ENGINE

(75) Inventor: Hikokazu Akimoto, Aichi-ken (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 439 days.

(21) Appl. No.: 12/530,049

(22) PCT Filed: Feb. 27, 2008

(86) PCT No.: PCT/JP2008/053410
§ 371 (c)(1),
(2), (4) Date: Sep. 4, 2009

(87) PCT Pub. No.: WO2008/108247
PCT Pub. Date: Sep. 12, 2008

(65) Prior Publication Data
US 2010/0030455 A1 Feb. 4, 2010

(30) Foreign Application Priority Data
Mar. 7, 2007 (JP) ................................. 2007-057584

(51) Int. Cl.
*F02D 41/22* (2006.01)
*F02D 29/02* (2006.01)
*F02D 45/00* (2006.01)
*F02M 25/07* (2006.01)

(52) U.S. Cl. ...................... 701/111; 123/568.11; 60/716; 73/114.07

(58) Field of Classification Search .................. 701/111; 123/568.11; 60/716; 73/114.02, 114.04, 73/114.07, 114.11
See application file for complete search history.

(56) References Cited

U.S. PATENT DOCUMENTS

| | | | | |
|---|---|---|---|---|
| 3,800,599 | A * | 4/1974 | Goran | 73/114.07 |
| 5,309,756 | A * | 5/1994 | Osawa et al. | 73/114.04 |
| 6,453,734 | B1 * | 9/2002 | Tomikawa et al. | 73/114.04 |
| 7,543,483 | B2 * | 6/2009 | Akimoto et al. | 73/114.03 |
| 7,707,874 | B2 * | 5/2010 | Suzuki | 73/114.04 |

(Continued)

FOREIGN PATENT DOCUMENTS

JP 05-149182 6/1993
(Continued)

*Primary Examiner* — Stephen K Cronin
*Assistant Examiner* — Arnold Castro
(74) *Attorney, Agent, or Firm* — Kenyon & Kenyon LLP (57) ABSTRACT

The internal combustion engine system makes detection on the occurrence or the non-occurrence of a misfire by comparing the 240-degree difference TD240 of the 30-degree rotation time T30 (CA) with the tentative detection reference value A1 and comparing the detection base difference ratios J1 and J5 with the ranges of the respective reference values B11, B12, B51 and B52 when the exhaust gas recirculation is performed, in addition to the methodology in the non-performance of the exhaust gas recirculation, that is, in addition to the methodology of comparing the 360-degree difference TD360 of the 30-degree rotation time T30 (CA) with the tentative detection reference value A1 and comparing the detection base difference ratios J0, J2 and J4 with the ranges of the respective reference values B01, B02, B21, B22, B41 and B42 (S410, S440). This arrangement enables to detect a misfire in any of cylinders of the engine 22 accurately even when the exhaust gas recirculation is performed or not performed.

10 Claims, 8 Drawing Sheets

U.S. PATENT DOCUMENTS

| | | | |
|---|---|---|---|
| 7,712,356 B2 * | 5/2010 | Suzuki | 73/114.04 |
| 7,775,089 B2 * | 8/2010 | Suzuki et al. | 73/114.15 |
| 7,788,020 B2 * | 8/2010 | Wolf et al. | 123/568.11 |
| 7,937,992 B2 * | 5/2011 | Akimoto et al. | 73/114.03 |
| 7,971,474 B2 * | 7/2011 | Suzuki | 73/114.02 |
| 2007/0084442 A1 * | 4/2007 | Nakagawa et al. | 73/118.1 |
| 2007/0261484 A1 * | 11/2007 | Nishigaki et al. | 73/118.2 |
| 2008/0148835 A1 * | 6/2008 | Akimoto et al. | 73/116.01 |
| 2008/0196485 A1 * | 8/2008 | Akimoto et al. | 73/114.02 |
| 2009/0063024 A1 * | 3/2009 | Katayama | 701/111 |
| 2009/0118990 A1 * | 5/2009 | Suzuki | 701/111 |
| 2009/0234562 A1 * | 9/2009 | Wolf et al. | 701/108 |

FOREIGN PATENT DOCUMENTS

| | | |
|---|---|---|
| JP | 5-164033 A | 6/1993 |
| JP | 10-054295 A | 2/1998 |
| JP | 2005-307945 A | 11/2005 |
| JP | 2006-266253 A | 10/2006 |

* cited by examiner

Fig. 11

INTERNAL COMBUSTION ENGINE SYSTEM, VEHICLE HAVING THE INTERNAL COMBUSTION ENGINE SYSTEM, AND ENGINE MISFIRE DETECTION METHOD FOR INTERNAL COMBUSTION ENGINE

This is a 371 national phase application of PCT/JP2008/053410 filed 27 Feb. 2008, claiming priority to Japanese Patent Application No. JP 2007-057584 filed 7 Mar. 2007, the contents of which are incorporated herein by reference.

TECHNICAL FIELD

The present invention relates to an internal combustion engine system, a vehicle having the internal combustion engine system, and an engine misfire detection method for an internal combustion engine. More specifically the invention pertains to an internal combustion engine system having a multi-cylinder internal combustion engine that is connected to a drive shaft via a torsion element and includes an exhaust gas recirculation device which performs introduction of part of exhaust into a gas intake line, a vehicle having the internal combustion engine system, and an engine misfire detection method of detecting a misfire of a multi-cylinder internal combustion engine in an internal combustion engine system, the internal combustion engine is connected to a drive shaft via a torsion element and includes an exhaust gas recirculation device which performs introduction of part of exhaust into a gas intake line.

BACKGROUND ART

One proposed structure of the internal combustion engine system makes tentative detection of occurrence of a misfire when a rotational fluctuation Δt of a crankshaft is greater than a predetermined reference value for detecting the misfire (see Patent Document 1). When the tentative detection is made in this system, the system makes a final detection on actual occurrence or non-occurrence of the misfire in the cylinder where the tentative detection of occurrence of the misfire is made. The final detection is made according to whether a rotational fluctuation ΔTN is greater than the product of a rotational fluctuation ΔTN(0) in non-occurrence of a misfire and a coefficient k. The rotational fluctuation ΔTN is a rotational fluctuation of the crankshaft in a power stroke of the cylinder ignited next to the cylinder where the tentative detection of occurrence of the misfire is made.
Patent Document 1: Japanese Patent Laid-Open No. 2005-307945

DISCLOSURE OF THE INVENTION

This prior art internal combustion engine system may make a misdetection of a misfire in an internal combustion engine having an exhaust gas recirculation (EGR) device. When exhaust gas recirculation is performed, combustion temperature and combustion rate are lowered in small oxygen concentration of inlet air. Therefore, a rotational fluctuation of the internal combustion engine behaves differently in comparison with a rotational fluctuation when the exhaust gas recirculation is not performed, and the system makes a misdetection in detecting a misfire in the case of applying the same logic as the one in non-performance of the exhaust gas recirculation.

In the internal combustion engine system, the vehicle having the internal combustion engine system, and the engine misfire detection method for the internal combustion engine of the invention, an object of the invention is to detect a misfire in the internal combustion engine regardless of whether exhaust gas recirculation is performed. In the internal combustion engine system, the vehicle having the internal combustion engine system, and the engine misfire detection method for the internal combustion engine of the present invention, another object of the invention is to detect a misfire in the internal combustion engine accurately regardless of whether exhaust gas recirculation is performed.

In order to attain at least part of the above and the other related objects, the internal combustion engine system, the vehicle having the internal combustion engine system, and the engine misfire detection method for the internal combustion engine of the invention have the configurations discussed below.

According to one aspect, the present invention is directed to an internal combustion engine system having a multi-cylinder internal combustion engine that is connected to a drive shaft via a torsion element and includes an exhaust gas recirculation device which performs introduction of part of exhaust into a gas intake line. The internal combustion engine system comprises: a rotational position detector that detects a rotational position of an output shaft of the internal combustion engine; a rotational fluctuation computation module that computes a rotational fluctuation of the output shaft at every specific rotational angle from the detected rotational position of the output shaft; and an engine misfire detection module that makes detection on occurrence or non-occurrence of a misfire in any of cylinders of the internal combustion engine based on a first angle difference that is a difference corresponding to a first preset angle of the computed rotational fluctuations when the introduction of part of exhaust into the gas intake line is not performed by the exhaust gas recirculation device, and makes detection on the occurrence or the non-occurrence of a misfire in any of cylinders of the internal combustion engine based on the first angle difference and a second angle difference that is a difference corresponding to a second preset angle smaller than the first preset angle of the computed rotational fluctuations when the introduction of part of exhaust into the gas intake line is not performed by the exhaust gas recirculation device.

The internal combustion engine system according to this aspect of the invention, makes detection on occurrence or non-occurrence of a misfire in any of cylinders of the internal combustion engine based on a first angle difference that is a difference corresponding to a first preset angle of the computed rotational fluctuations of the output shaft of the internal combustion engine at every specific rotational angle from the rotational position of the output shaft when the introduction of part of exhaust into the gas intake line is not performed by the exhaust gas recirculation device, and makes detection on the occurrence or the non-occurrence of a misfire in any of cylinders of the internal combustion engine based on the first angle difference and a second angle difference that is a difference corresponding to a second preset angle smaller than the first preset angle of the rotational fluctuations of the output shaft when the introduction of part of exhaust into the gas intake line is not performed by the exhaust gas recirculation device. When the exhaust gas recirculation device does not perform introduction of exhaust from the internal combustion engine into the gas intake line, the system makes detection on the occurrence or the non-occurrence of a misfire in any of cylinders of the internal combustion engine based on the first angle difference. When the exhaust gas recirculation device performs introduction of exhaust from the internal combustion engine into the gas intake line, the system makes detection on the occurrence or the non-occurrence of a misfire in any of cylinders of the internal combustion engine based on the second angle difference in addition to the first angle difference. Therefore, this arrangement enables to detect a misfire accurately in the internal combustion engine even when exhaust gas recirculation is performed.

In one preferable application of the internal combustion engine system according to the above aspect of the invention, the first preset angle is 360 degrees and the second preset angle is an angle which is an integral multiple of 720 degrees divided by the number of cylinders of the internal combustion engine. In this case, the second preset angle may be the closest angle to 360 degrees among integral multiples of 720 degrees divided by the number of cylinders of the internal combustion engine. In the case of the internal combustion engine having four strokes of intake, compression, expansion, and exhaust, all the strokes completes in 720 degrees. When the first preset angle is 360 degrees, this application thus detects a misfire based on the difference (first angle difference) between the rotational fluctuations of a target cylinder and a counter cylinder (cylinder where ignition timing is delayed by 360 degrees) which is least influenced by the rotational fluctuation of the target cylinder in view of sequence of explosive combustion. This arrangement enables to detect a misfire more accurately. The arrangement adopting a 360-degree difference is little influenced by sensor tolerances. Accordingly, noise due to the tolerances is desirably eliminated.

In another preferable application of the internal combustion engine system according to the above aspect of the invention, the engine misfire detection module makes detection on occurrence or non-occurrence of a misfire in a misfire target cylinder, that is a target cylinder for the misfire, of the internal combustion engine based on respective ratios of rotational fluctuations of a cylinder combusted 360 degrees before the misfire target cylinder, a cylinder combusted immediately before the misfire target cylinder, and a cylinder combusted immediately after the misfire target cylinder to a rotational fluctuation of the misfire target cylinder, when the introduction of part of exhaust into the gas intake line is not performed, and makes detection on the occurrence or the non-occurrence of a misfire in the misfire target cylinder based on respective ratios of rotational fluctuations of the cylinder combusted 360 degrees before the misfire target cylinder, two cylinders consecutively combusted immediately before the misfire target cylinder, and two cylinders consecutively combusted immediately after the misfire target cylinder to a rotational fluctuation of the misfire target cylinder, when the introduction of part of exhaust into the gas intake line is performed. This arrangement enables to detect a misfire in the internal combustion engine accurately even when exhaust gas recirculation is not performed or is performed.

In still another preferable application of the internal combustion engine system according to the above aspect of the invention, the rotational fluctuation computation module computes a unit rotational angle rotation time, as the rotational fluctuation, that is a time required for rotation of the output shaft of the internal combustion engine by the specific rotational angle every time the output shaft rotates by the specific rotational angle. The unit rotational angle rotation time corresponds to the reciprocal of rotational angular velocity regarded as rotational fluctuation. This arrangement enables to detect a misfire using the unit rotational angle rotation time in place of the rotational angular velocity regarded as rotational fluctuation.

In one preferable embodiment of the internal combustion engine system according to the above aspect of the invention, the internal combustion engine system further has: an electric power-mechanical power input output assembly connected with the output shaft of the internal combustion engine via the torsion element and with the drive shaft and configured to input and output power to and from the output shaft and the drive shaft through input and output of electric power and mechanical power; and a motor constructed to input and output power to and from the drive shaft. In this case, the electric power-mechanical power input and output assembly may have: a generator constructed to input and output power; and a three shaft-type power input output structure connected to three shafts, the output shaft of the internal combustion engine, the drive shaft, and a rotating shaft of the generator, and designed to input and output power to residual shaft based on powers input from and output to any two shafts among the three shafts.

According another aspect, the present invention is directed to a vehicle having any of the above arrangements of the internal combustion engine system as a power source, and an axle of the vehicle is linked to the drive shaft. Here the internal combustion engine system having a multi-cylinder internal combustion engine that is connected to a drive shaft via a torsion element and includes an exhaust gas recirculation device which performs introduction of part of exhaust into a gas intake line, the internal combustion engine system fundamentally comprises: a rotational position detector that detects a rotational position of an output shaft of the internal combustion engine; a rotational fluctuation computation module that computes a rotational fluctuation of the output shaft at every specific rotational angle from the detected rotational position of the output shaft; and an engine misfire detection module that makes detection on occurrence or non-occurrence of a misfire in any of cylinders of the internal combustion engine based on a first angle difference that is a difference corresponding to a first preset angle of the computed rotational fluctuations when the introduction of part of exhaust into the gas intake line is not performed by the exhaust gas recirculation device, and makes detection on the occurrence or the non-occurrence of a misfire in any of cylinders of the internal combustion engine based on the first angle difference and a second angle difference that is a difference corresponding to a second preset angle smaller than the first preset angle of the computed rotational fluctuations when the introduction of part of exhaust into the gas intake line is not performed by the exhaust gas recirculation device.

The vehicle according to this aspect of the invention has any of the above arrangements of the internal combustion engine system described above as a power source. The vehicle thus has such an effect of enabling to detect a misfire accurately in the internal combustion engine even when exhaust gas recirculation is performed, as any of the above arrangements of the internal combustion engine system of the invention has.

According to another aspect, the present invention is directed to an engine misfire detection method of detecting a misfire of a multi-cylinder internal combustion engine in an internal combustion engine system, the internal combustion engine is connected to a drive shaft via a torsion element and includes an exhaust gas recirculation device which performs introduction of part of exhaust into a gas intake line. The engine misfire detection method includes the steps of: (a) computing a rotational fluctuation of an output shaft of the internal combustion engine at every specific rotational angle from a rotational position of the output shaft; and (b) making detection on occurrence or non-occurrence of a misfire in any of cylinders of the internal combustion engine based on a first angle difference that is a difference corresponding to a first preset angle of the computed rotational fluctuations when the introduction of part of exhaust into the gas intake line is not performed by the exhaust gas recirculation device, and making detection on the occurrence or the non-occurrence of a misfire in any of cylinders of the internal combustion engine based on the first angle difference and a second angle difference that is a difference corresponding to a second preset angle smaller than the first preset angle of the computed rotational fluctuations when the introduction of part of exhaust into the gas intake line is not performed by the exhaust gas recirculation device.

The engine misfire detection method according to this aspect of the invention, makes detection on occurrence or non-occurrence of a misfire in any of cylinders of the internal combustion engine based on a first angle difference that is a difference corresponding to a first preset angle of the computed rotational fluctuations of the output shaft of the internal combustion engine at every specific rotational angle from the rotational position of the output shaft when the introduction of part of exhaust into the gas intake line is not performed by the exhaust gas recirculation device, and makes detection on the occurrence or the non-occurrence of a misfire in any of cylinders of the internal combustion engine based on the first angle difference and a second angle difference that is a difference corresponding to a second preset angle smaller than the first preset angle of the rotational fluctuations of the output shaft when the introduction of part of exhaust into the gas intake line is not performed by the exhaust gas recirculation device. When the exhaust gas recirculation device does not perform introduction of exhaust from the internal combustion engine into the gas intake line, the system makes detection on the occurrence or non-occurrence of a misfire in any of cylinders of the internal combustion engine based on the first angle difference. When the exhaust gas recirculation device performs introduction of exhaust from the internal combustion engine into the gas intake line, the system makes detection on the occurrence or non-occurrence of a misfire in any of cylinders of the internal combustion engine based on the second angle difference in addition to the first angle difference. Therefore, this arrangement enables to detect a misfire in the internal combustion engine accurately even when exhaust gas recirculation is performed.

In one preferable application of the engine misfire detection method according to the above aspect of the invention, the step (b) makes detection on occurrence or non-occurrence of a misfire in a misfire target cylinder, that is a target cylinder for the misfire, of the internal combustion engine based on respective ratios of rotational fluctuations of a cylinder combusted 360 degrees before the misfire target cylinder, a cylinder combusted immediately before the misfire target cylinder, and a cylinder combusted immediately after the misfire target cylinder to a rotational fluctuation of the misfire target cylinder, when the introduction of part of exhaust into the gas intake line is not performed, and makes detection of the occurrence or the non-occurrence of a misfire in the misfire target cylinder based on respective ratios of rotational fluctuations of the cylinder combusted 360 degrees before the misfire target cylinder, two cylinders consecutively combusted immediately before the misfire target cylinder, and two cylinders consecutively combusted immediately after the misfire target cylinder to a rotational fluctuation of the misfire target cylinder, when the introduction of part of exhaust into the gas intake line is performed. This arrangement enables to detect a misfire in the internal combustion engine accurately even when exhaust gas recirculation is not performed or is performed.

BRIEF DESCRIPTION OF THE DRAWINGS

FIG. 3 shows one example of a timing rotor 140a;

BEST MODES OF CARRYING OUT THE INVENTION

Figure 1:
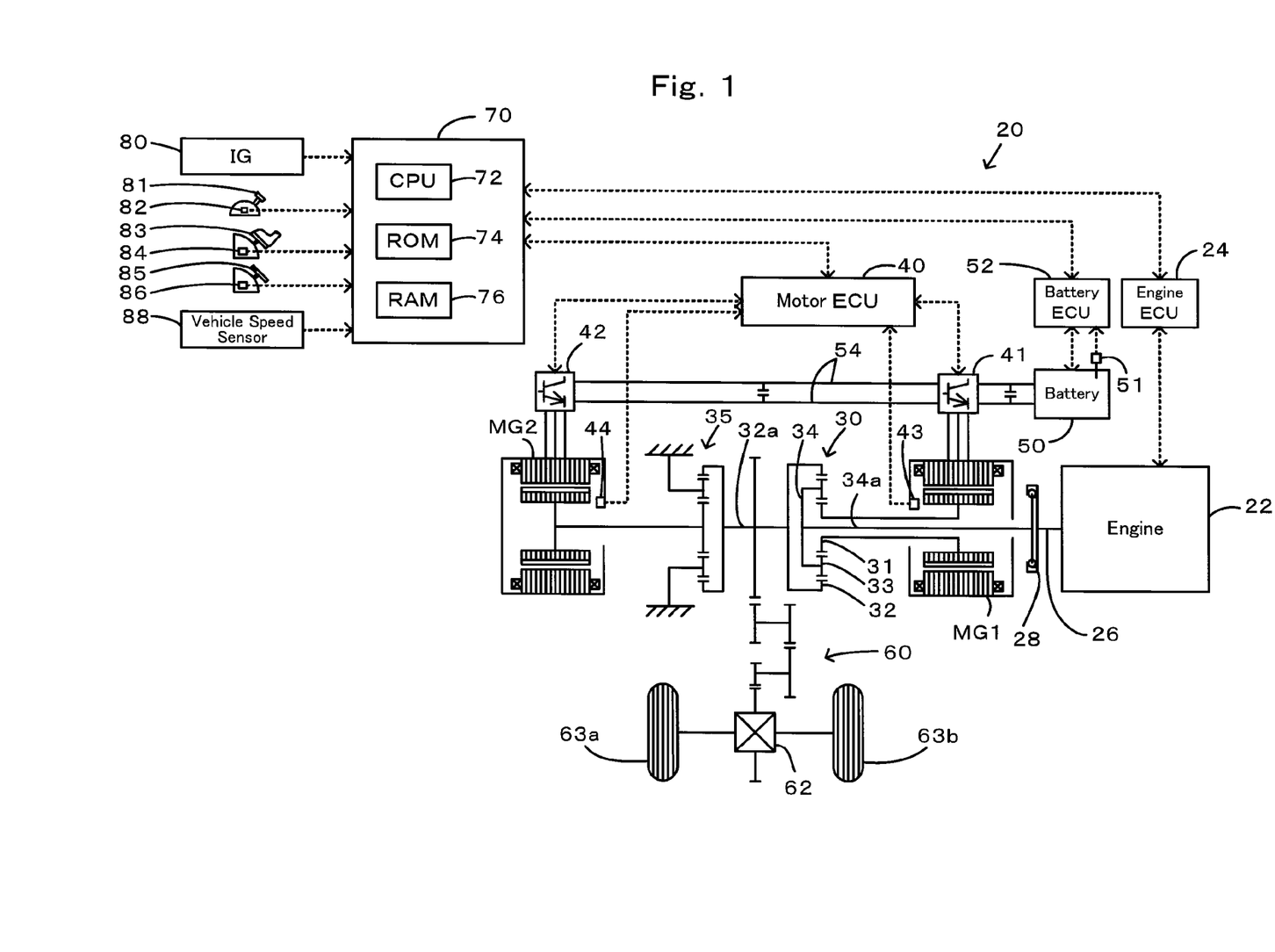
FIG. 1 schematically illustrates the configuration of a hybrid vehicle 20 in one embodiment of the invention.

One mode of carrying out the invention is discussed below as a preferred embodiment. FIG. 1 schematically illustrates the configuration of a hybrid vehicle 20 with an internal combustion engine system mounted thereon in one embodiment according to the invention. As illustrated, the hybrid vehicle 20 of the embodiment includes an engine 22, a three shaft-type power distribution integration mechanism 30 that is linked with a crankshaft 26 functioning as an output shaft of the engine 22 via a damper 28 functioning as a torsion element, a motor MG1 that is linked with the power distribution integration mechanism 30 and is capable of generating electric power, a reduction gear 35 that is attached to a ring gear shaft 32a functioning as a drive shaft connected with the power distribution integration mechanism 30, another motor MG2 that is linked with the reduction gear 35, and a hybrid electronic control unit 70 that controls the whole vehicle. In the structure of this embodiment, the engine 22, the three shaft-type power distribution integration mechanism 30 linked with the engine 22 via the damper 28, the motor MG1, and an engine electronic control unit 24 for controlling the operations of the engine 22 mainly function as the internal combustion engine system.

Figure 2:
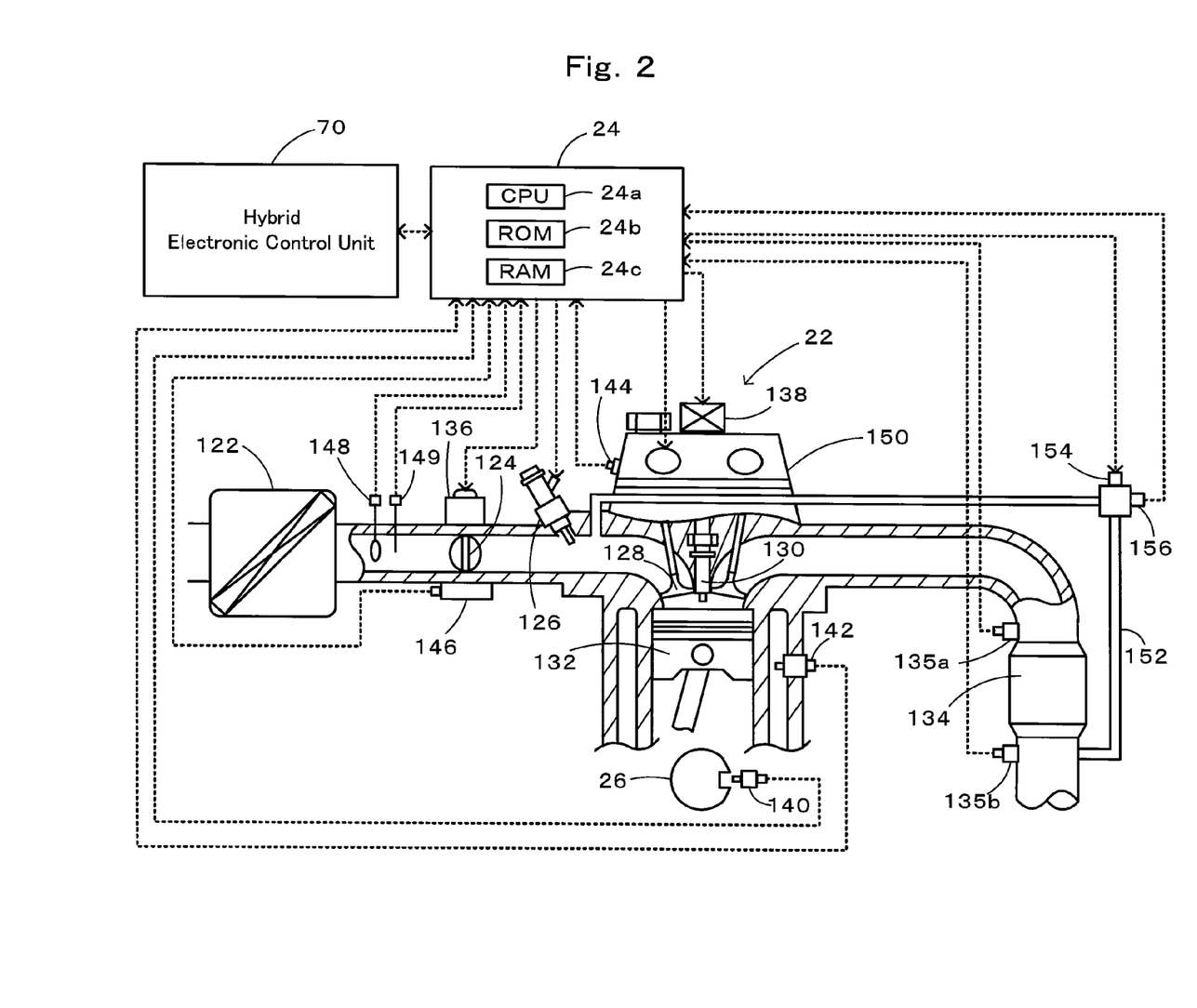
FIG. 2 schematically illustrates the configuration of an engine 22.

The engine 22 is a six-cylinder internal combustion engine that consumes a hydrocarbon fuel, such as gasoline or light oil, to output power. As shown in FIG. 2, the air cleaned by an air cleaner 122 and taken in via a throttle valve 124 is mixed with the atomized gasoline injected by a fuel injection valve 126 included in every cylinder to the air-fuel mixture. The air-fuel mixture is introduced into a combustion chamber via an intake valve 128. The introduced air-fuel mixture is ignited with spark made by a spark plug 130 to be explosively combusted. The reciprocating motions of a piston 132 by the combustion energy are converted into rotational motions of a crankshaft 26. The exhaust from the engine 22 goes through a catalytic conversion unit 134 (filled with three-way catalyst) to convert toxic components included in the exhaust, that is, carbon monoxide (CO), hydrocarbons (HC), and nitrogen oxides (NOx), into harmless components, and is discharged to the outside air. An EGR tube 152 is located after the catalytic converter 134 to recirculate the purified exhaust to a gas intake line. The engine 22 is thus designed to supply the purified exhaust as an uncombusted gas to the gas intake line and introduce the mixture of the air, the purified exhaust, and the fuel into the combustion chamber.

Figure 3:
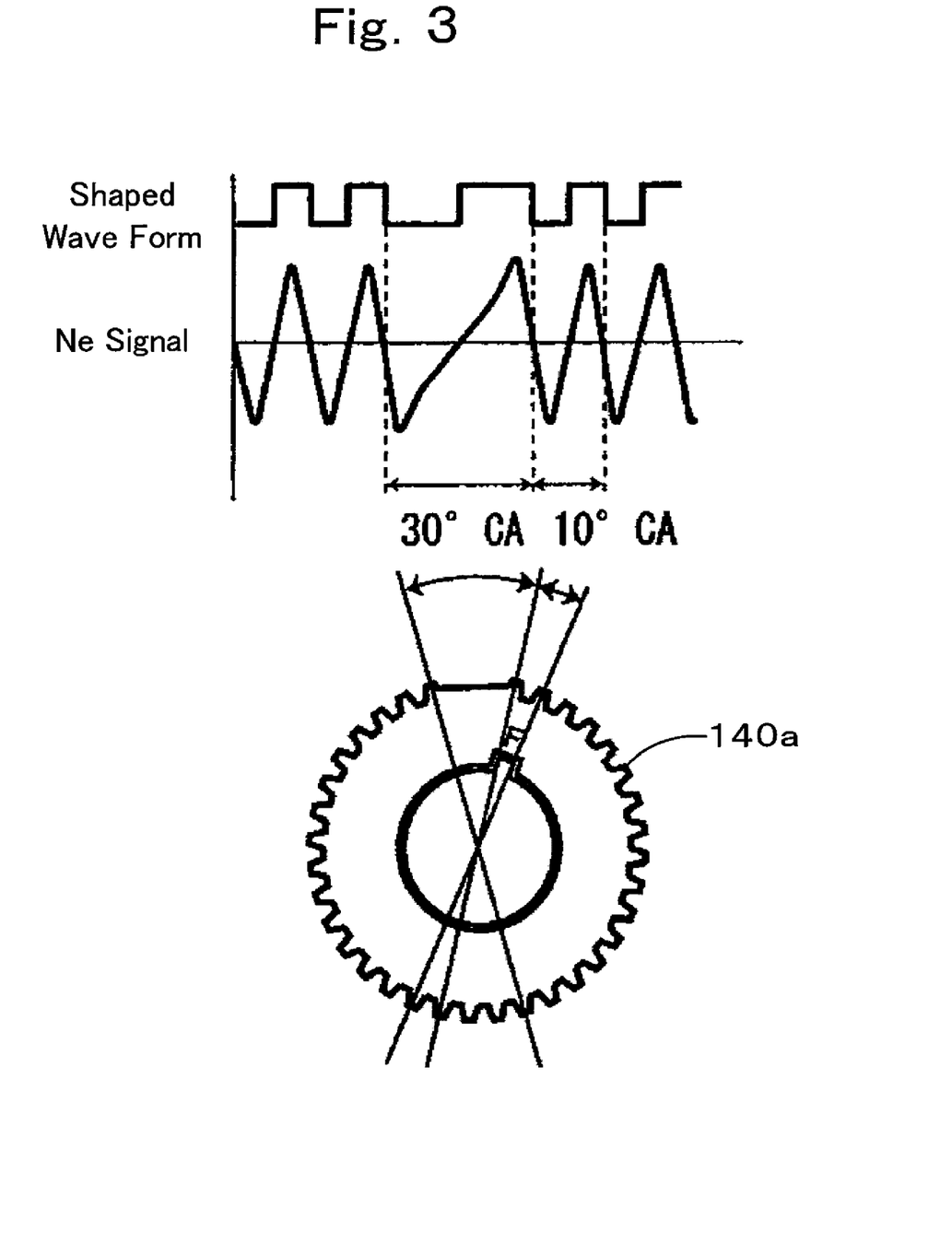

The engine 22 is under control of the engine electronic control unit 24 (hereafter referred to as engine ECU 24). The engine ECU 24 is constructed as a microprocessor including a CPU 24a, a ROM 24b that stores processing programs, a RAM 24c that temporarily stores data, input and output ports (not shown), and a communication port (not shown). The engine ECU 24 receives, via its input port (not shown), signals from various sensors that measure and detect the conditions of the engine 22. The signals input into the engine ECU 24 include a crank position from a crank position sensor 140 detected as the rotational position of the crankshaft 26, a cooling water temperature from a water temperature sensor 142 measured as the temperature of cooling water in the engine 22, a cam position from a cam position sensor 144 detected as the rotational position of a camshaft driven to open and close the intake valve 128 and an exhaust valve for gas intake and exhaust into and from the combustion chamber, a throttle valve position from a throttle valve position sensor 146 detected as the opening or position of the throttle valve 124, an air flow meter signal from an air flow meter 148 attached to an air intake conduit, an intake air temperature from a temperature sensor 149 attached to the air intake conduit, an air-fuel ratio AF from an air-fuel ratio sensor 135a, an oxygen signal from an oxygen sensor 135b, and an EGR gas temperature from a temperature sensor 156 detected as the temperature of the EGR gas in the EGR tube 152. The engine ECU 24 outputs, via its output port (not shown), diverse control signals and driving signals to drive and control the engine 22, for example, driving signals to the fuel injection valve 126, driving signals to a throttle valve motor 136 for regulating the position of the throttle valve 124, control signals to an ignition coil 138 integrated with an igniter, control signals to a variable valve timing mechanism 150 to vary the open and close timings of the intake valve 128, and driving signals to an EGR valve 154 to regulate the flow of the purified exhaust recirculated to the gas intake line. The engine ECU 24 communicates with the hybrid electronic control unit 70. The engine ECU 24 receives control signals from the hybrid electronic control unit 70 to drive and control the engine 22, while outputting data regarding the driving conditions of the engine 22 to the hybrid electronic control unit 70 according to the requirements. The crank position sensor 140 is constructed as an electromagnetic pickup sensor having a timing rotor 140a. As shown in FIG. 3, the timing rotor 140a is attached to the crankshaft 26 to be rotated in synchronism with rotation of the crankshaft 26 and is designed to have teeth arranged at 10-degree intervals and two tooth-missing spaces corresponding to two teeth for specifying a reference position. A shaped waveform is generated in response to each 10-degree rotation of the crankshaft 26. The engine ECU 24 computes a rotation speed at every 30-degree rotation of the crankshaft 26 as a rotation speed Ne of the engine 22 based on the shaped wave form generated in the crank position sensor 140.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the reduction gear 35 via ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 63a and 63b via the gear mechanism 60, and the differential gear 62 from ring gear shaft 32a.

Both the motors MG1 and MG2 are known synchronous motor generators that are driven as a generator and as a motor. The motors MG1 and MG2 transmit electric power to and from a battery 50 via inverters 41 and 42. Power lines 54 that connect the inverters 41 and 42 with the battery 50 are constructed as a positive electrode bus line and a negative electrode bus line shared by the inverters 41 and 42. This arrangement enables the electric power generated by one of the motors MG1 and MG2 to be consumed by the other motor. The battery 50 is charged with a surplus of the electric power generated by the motor MG1 or MG2 and is discharged to supplement an insufficiency of the electric power. When the power balance is attained between the motors MG1 and MG2, the battery 50 is neither charged nor discharged. Operations of both the motors MG1 and MG2 are controlled by a motor electronic control unit (hereafter referred to as motor ECU) 40. The motor ECU 40 receives diverse signals required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals to the inverters 41 and 42. The motor ECU 40 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements. The motor ECU 40 also computes rotation speeds Nm1 and Nm2 of the motors MG1 and MG2 from the output signals of the rational position detection sensors 43 and 44.

The battery 50 is under control of a battery electronic control unit (hereafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor (not shown) attached to the power line 54 connected with the output terminal of the battery 50, and a battery temperature Tb measured by a temperature sensor 51 attached to the battery 50. The battery ECU 52 outputs data relating to the state of the battery 50 to the hybrid electronic control unit 70 via communication according to the requirements. The battery ECU 52 also performs various arithmetic operations for management and control of the battery 50. A remaining charge or state of charge (SOC) of the battery 50 is calculated from an integrated value of the charge-discharge current measured by the current sensor. An input limit Win as an allowable charging electric power to be charged in the battery 50 and an output limit Wout as an allowable discharging electric power to be discharged from the battery 50 are set corresponding to the calculated state of charge (SOC) and the battery temperature Tb.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 88. The hybrid electronic control unit 70 communicates with the engine ECU 24, the motor ECU 40, and the battery ECU 52 via the communication port to transmit diverse control signals and data to and from the engine ECU 24, the motor ECU 40, and the battery ECU 52, as mentioned previously.

The hybrid vehicle 20 of the embodiment thus constructed calculates a torque demand to be output to the ring gear shaft 32a functioning as the drive shaft, based on observed values of a vehicle speed V and an accelerator opening Acc, which corresponds to a driver's step-on amount of an accelerator pedal 83. The engine 22 and the motors MG1 and MG2 are subjected to operation control to output a required level of power corresponding to the calculated torque demand to the ring gear shaft 32a. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32a. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32a, simultaneously with charge or discharge of the battery 50. The motor drive mode stops the operations of the engine 22 and drives and controls the motor MG2 to output a quantity of power equivalent to the required level of power to the ring gear shaft 32a.

Figure 4:
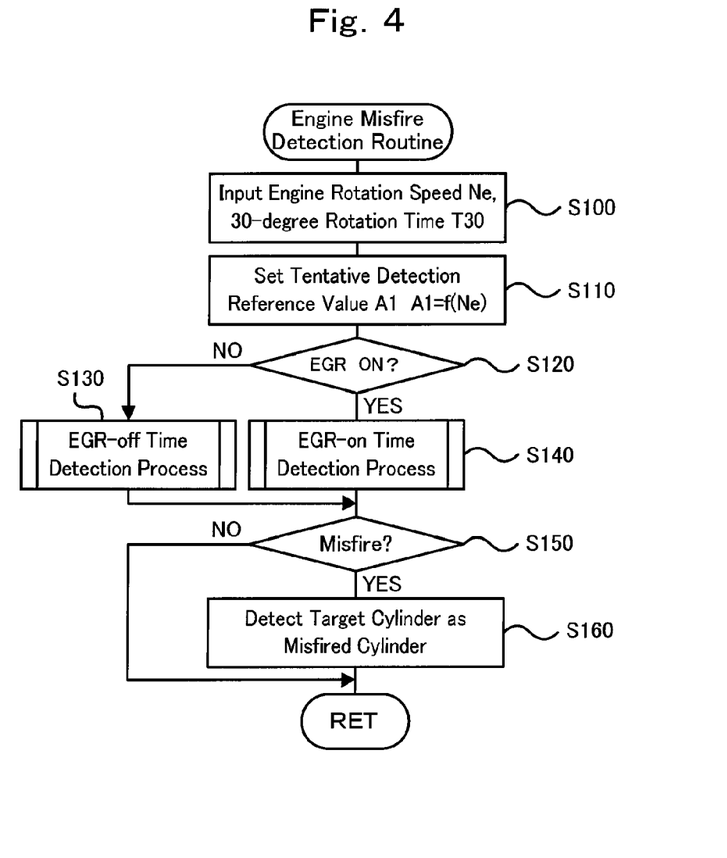
FIG. 4 is a flowchart showing an engine misfire detection routine executed by the engine ECU 24.

The following describes a series of operations to detect occurrence or non-occurrence of any misfired cylinder among the six cylinders of the engine 22 mounted on the hybrid vehicle 20 of the embodiment. FIG. 4 is a flowchart showing an engine misfire detection routine executed by the engine ECU 24. The engine misfire detection routine is performed repeatedly at preset time intervals.

Figure 5:
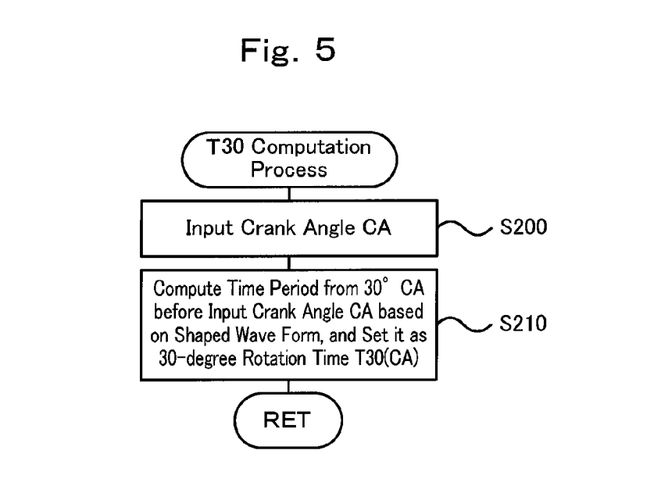
FIG. 5 is a flowchart showing a 30-degree rotation time T30 computation process.

On the start of the engine misfire detection routine, the CPU 24a of the engine ECU 24 first inputs a crank angle CA detected by the crank position sensor 140, the rotation speed Ne of the engine 22, and a 30-degree rotation time T30 (CA) computed according to a T30 computation process shown in the flowchart of FIG. 5 as a time period required for a 30-degree rotation of the crankshaft 26 (step S100). The rotation speed Ne of the engine 22 is computed from the crank angle CA detected by the crank position sensor 140. The T30 computation process to compute the 30-degree rotation time T30 (CA) inputs the crank angle CA (step S200), computes a time period where the crank angle CA reaches the input crank angle CA from a crank angle CA which is 30 degrees CA before the input crank angle CA based on the shaped wave form generated in the crank position sensor 140, and sets the computed time period to the 30-degree rotation time T30 (CA) (step S210). A reciprocal of the 30-degree rotation time T30 (CA) represents a rotation speed of the engine 22 at the time of every 30-degree rotation of the crankshaft 26 (hereafter referred to as 30-degree rotation speed N30 (CA)). The 30-degree rotation time T30 (CA) accordingly shows the degree of a change of the 30-degree rotation speed N30, that is, a rotational variation in the unit of time.

The CPU 24a of the engine ECU 24 subsequently sets a tentative detection reference value A1 based on the rotation speed Ne of the engine 22 (step S110). The tentative detection reference value A1 is greater than the 360-degree difference of the 30-degree rotation time T30 at a preset angle (for example, 30 degrees or 60 degrees after the top dead center in the compression stroke) in the combustion stroke of a non-misfired cylinder and smaller than the 360-degree difference of the 30-degree rotation time T30 at the preset angle in the combustion stroke of a misfired cylinder. A concrete procedure of setting the tentative detection reference value A1 in this embodiment provides and stores in advance by experiment or the like variations in the tentative detection reference value A1 against the rotation speed Ne of the engine 22 as a tentative detection reference value setting map in the ROM 24b, and reads the tentative detection reference value A1 corresponding to the given rotation speed Ne of the engine 22 from this tentative detection reference values setting map.

After the setting of the tentative detection reference value A1, the CPU 24a of the engine ECU 24 determines whether an exhaust gas recirculation is performed through the EGR tube 152 or not (step S120). This determination is made according to whether the EGR valve 154 is opened by the driving signals to the EGR valve 154 or not. Upon the determination that the exhaust gas recirculation is not performed, the CPU 24a detects occurrence or non-occurrence of a misfire in any of six cylinders of the engine 22 according to a EGR-off time detection process shown in the flowchart of FIG. 6 (step S130). Upon the determination that the exhaust gas recirculation is performed, the CPU 24a detects occurrence or non-occurrence of a misfire in any of six cylinders of the engine 22 according to a EGR-on time detection process shown in the flowchart of FIG. 7 (step S140). When the occurrence of a misfire is detected (step S150), the target cylinder in each detection process is specified as a misfired cylinder (step S160). The engine misfire detection routine is then terminated.

Figure 6:
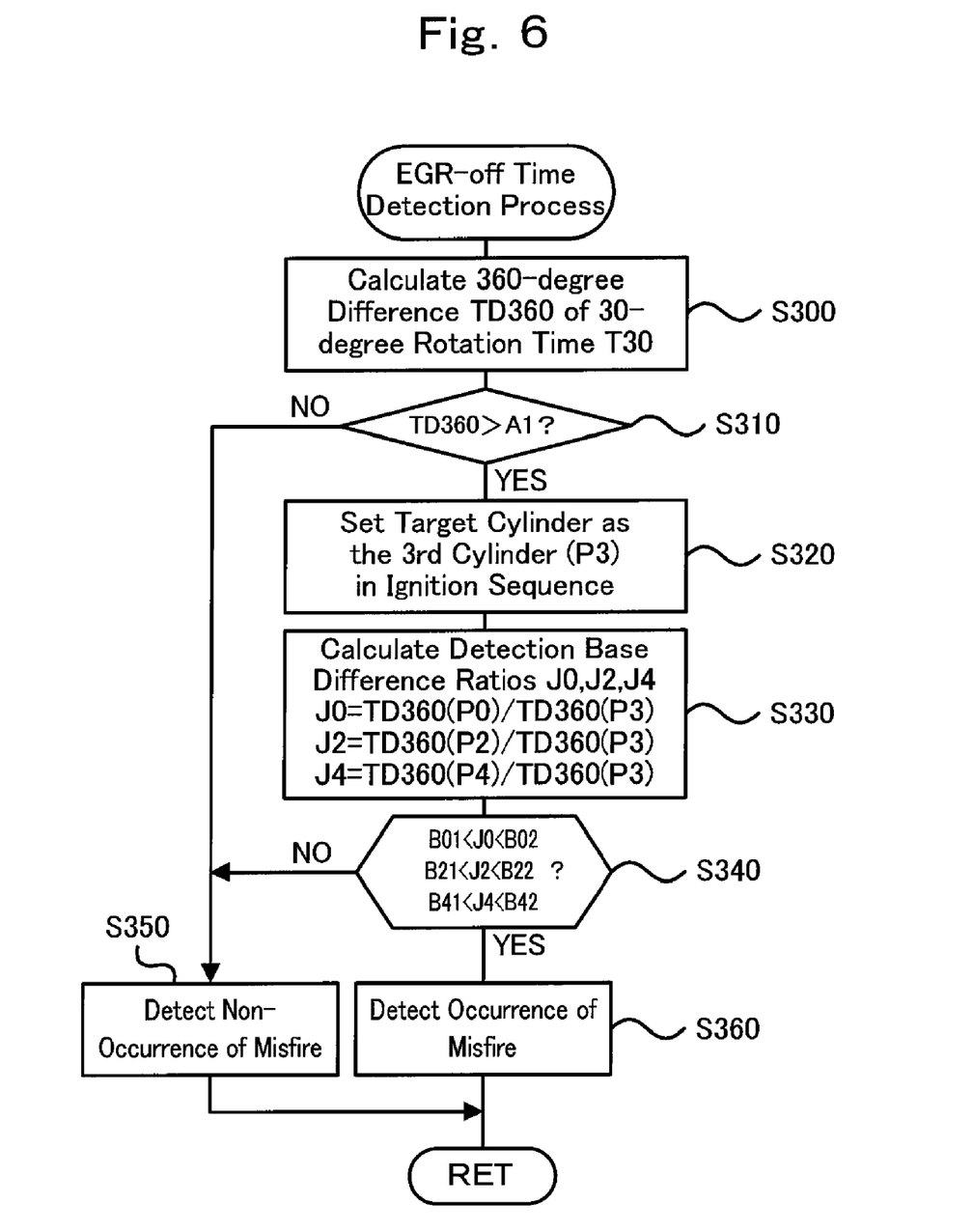
FIG. 6 is a flowchart showing a EGR-off time detection process.
Figure 8:
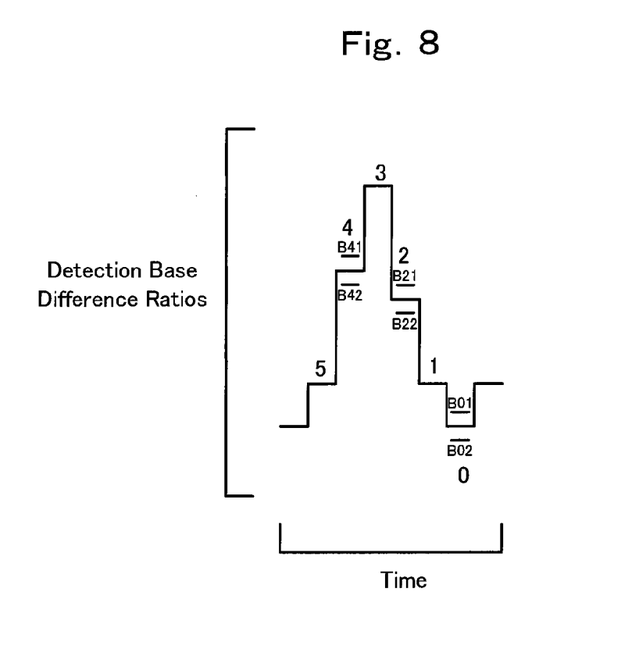
FIG. 8 shows a relation between detection base difference ratios J0, J2 and J4 at every cylinder and reference values B01, B02, B21, B22, B41 and B42 when the exhaust gas recirculation is not performed.

In the EGR-off time detection process, the CPU 24a of the engine ECU 24 calculates a 360-degree difference of the 30-degree rotation time T30 at a preset angle (for example, 30 degrees or 60 degrees after the top dead center in the compression stroke) in the combustion stroke of each cylinder as a 360-degree difference TD360 (step S300), and compares the calculated 360-degree difference TD360 with the tentative detection reference value A1 (step S310). The 360-degree difference TD360 is regarded as a difference between the 30-degree rotation time T30 (CA) in a target cylinder and the 30-degree rotation time T30 (CA) in the farthest cylinder from the target cylinder in view of ignition sequence. That is, the farthest cylinder is least influenced by the condition of whether a misfire occurs or not in the target cylinder. The use of such the 360-degree difference TD360 enables to detect the occurrence or non-occurrence of a misfire in the target cylinder more appropriately. When the 360-degree difference TD360 is less than or equal to the tentative detection reference value A1, non-occurrence of a misfire in the target cylinder is detected (step S350). The detection process is then terminated. When the 360-degree difference TD360 is more than the tentative detection reference value A1, the target cylinder is set as the 3rd cylinder in ignition sequence (step S320). The CPU 24a subsequently calculates the ratio of the 360-degree difference TD360 in the 0th cylinder to the 360-degree difference TD360 in the 3rd cylinder as a detection base difference ratio J0, the ratio of the 360-degree difference TD360 in the 2nd cylinder to the 360-degree difference TD360 in the 3rd cylinder as a detection base difference ratio J2, and the ratio of the 360-degree difference TD360 in the 4th cylinder to the 360-degree difference TD360 in the 3rd cylinder as a detection base difference ratio J4 (step S330). The CPU 24a then identifies whether the calculated detection base difference ratio J0 is in the range of reference values B01 and B02, whether the calculated detection base difference ratio J2 is in the range of reference values B21 and B22, and whether the calculated detection base reference ratio J4 is in the range of reference values B41 and B42 (step S340). When at least any one of the detection base difference ratios J0, J2 and J4 is out of the range of the respective reference values B01, B02, B21, B22, B41 and B42, non-occurrence of a misfire in the target cylinder is detected (step S350). When all of the detection base difference ratios J0, J2 and J4 are in the ranges of the respective reference values B01, B02, B21, B22, B41 and B42, occurrence of a misfire in the target cylinder is detected (step S360). The detection process is then terminated. The reference values B01, B02, B21, B22, B41 and B42 are set based on the characteristics of the engine 22 and the like as the values defining allowable ranges of the detection base difference ratios J0, J2 and J4 during the occurrence of a misfire in the target cylinder while the exhaust gas recirculation is not performed. FIG. 8 shows a relation between detection base difference ratios J0, J2 and J4 at every cylinder and reference values B01, B02, B21, B22, B41, and B42 when the exhaust gas recirculation is not performed.

Figure 7:
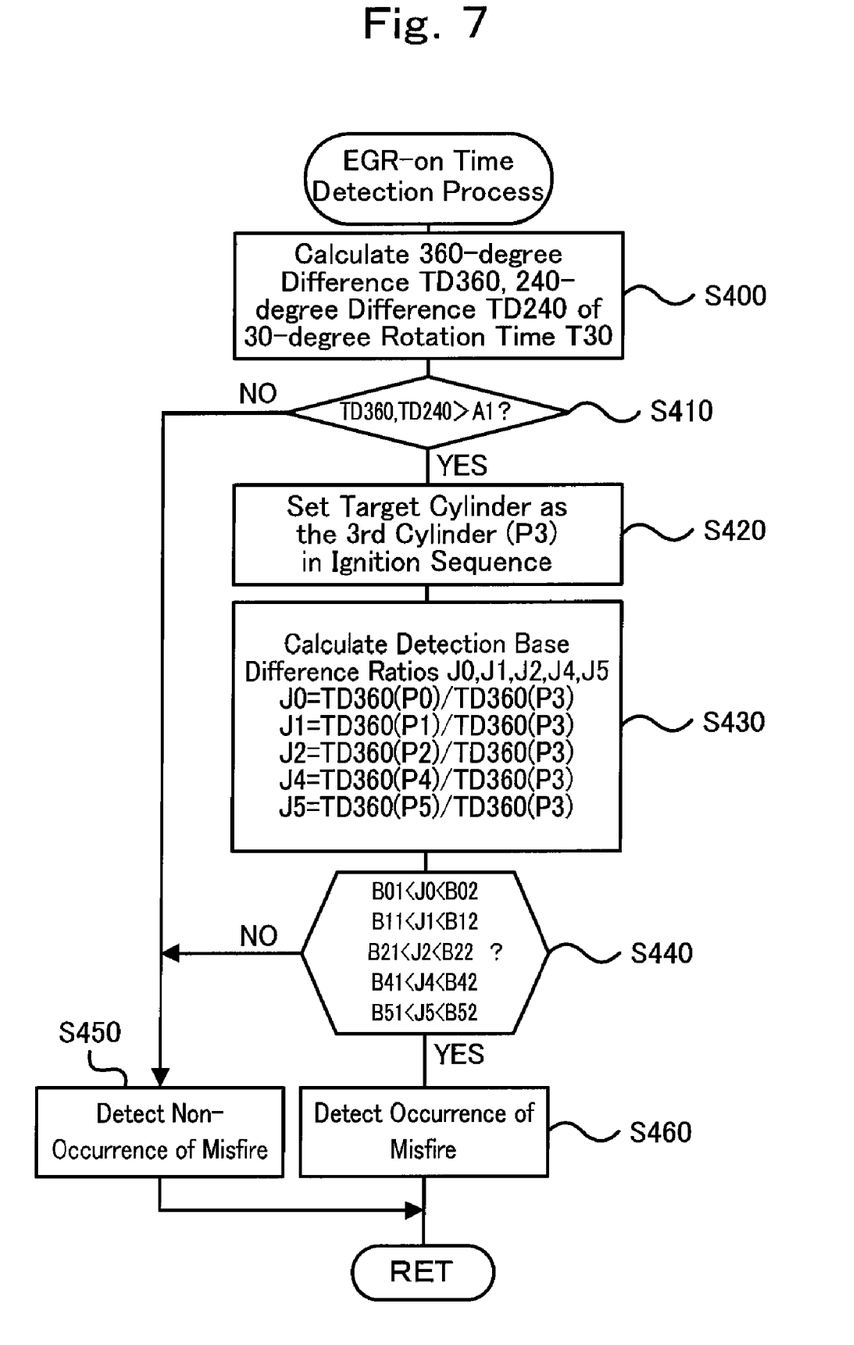
FIG. 7 is a flowchart showing a EGR-on time detection process.
Figure 9:
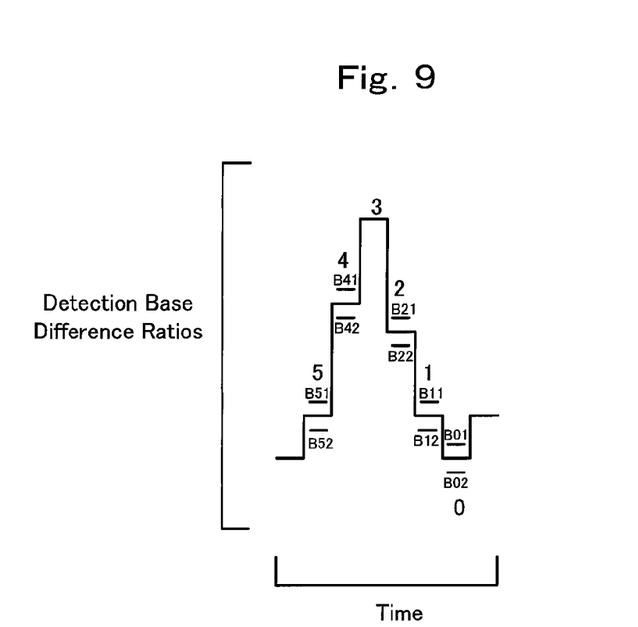
FIG. 9 shows a relation between detection base difference ratios J0, J1, J2, J4 and J5 at every cylinder and reference values B01, B02, B11, B12, B21, B22, B41, B42, B51 and B52 when the exhaust gas recirculation is performed.

In the EGR-on time detection process, the CPU 24a of the engine ECU 24 calculates a 360-degree difference of the 30-degree rotation time T30 at a preset angle (for example, 30 degrees or 60 degrees after the top dead center in the compression stroke) in the combustion stroke of each cylinder as a 360-degree difference TD360 and a 240-degree difference of the 30-degree rotation time T30 (CA) in a like manner as a 240-degree difference TD240 (step S400), and compares the calculated 360-degree difference TD360 and 240-degree difference TD240 with the tentative detection reference value A1 respectively (step S410). The 240-degree difference TD240 is regarded as a difference between the 30-degree rotation time T30 (CA) in a target cylinder and the 30-degree rotation time T30 (CA) in the next cylinder to the farthest cylinder from a target cylinder in view of ignition sequence. That is, the next cylinder to the farthest cylinder is influenced next least by the condition of whether a misfire occurs or not in the target cylinder. Here, an angle of 240 degrees is the closest angle to 360 degrees among integral multiples of 720 degrees divided by the number of cylinders (6) of the engine 22. The use of such the 360-degree difference TD360 and 240-degree difference TD240 enables to detect the occurrence or non-occurrence of a misfire in the target cylinder more appropriately. When either of the 360-degree difference TD360 or the 240-degree difference TD240 is less than or equal to the tentative detection reference value A1, non-occurrence of a misfire in the target cylinder is detected (step S450). The detection process is then terminated. When both of the 360-degree difference TD360 and 240-degree difference TD240 are more than the tentative detection reference value A1, the target cylinder is set as the 3rd cylinder in ignition sequence (step S420). The CPU 24a subsequently calculates the ratio of the 360-degree difference TD360 in the 0th cylinder to the 360-degree difference TD360 in the 3rd cylinder as a detection base difference ratio J0, the ratio of the 360-degree difference TD360 in the 1st cylinder to the 360-degree difference TD360 in the 3rd cylinder as a detection base difference ratio J1, the ratio of the 360-degree difference TD360 in the 2nd cylinder to the 360-degree difference TD360 in the 3rd cylinder as a detection base difference ratio J2, the ratio of the 360-degree difference TD360 in the 4th cylinder to the 360-degree difference TD360 in the 3rd cylinder as a detection base difference ratio J4, and the ratio of the 360-degree difference TD360 in the 5th cylinder to the 360-degree difference TD360 in the 3rd cylinder as a detection base difference ratio J5 (step S430). The CPU 24a then identifies whether the calculated detection base difference ratio J0 is in the range of reference values B01 and B02, whether the calculated detection base difference ratio J1 is in the range of reference values B11 and B12, whether the calculated detection base difference ratio J2 is in the range of reference values B21 and B22, whether the calculated detection base reference ratio J4 is in the range of reference values B41 and B42, and whether the calculated detection base difference ratio J5 is in the range of reference values B51 and B52 (step S440). When at least any one of the detection base difference ratios J0, J1, J2, J4 and J5 is out of the range of the respective reference values B01, B02, B11, B12, B21, B22, B41, B42, B51 and B52, non-occurrence of a misfire in the target cylinder is detected (step S450). When all of the detection base difference ratios J0, J1, J2, J4 and J5 are in the ranges of the respective reference values B01, B02, B11, B12, B21, B22, B41, B42, B51 and B52, occurrence of a misfire in the target cylinder is detected (step S460). The detection process is then terminated. The reference values B01, B02, B11, B12, B21, B22, B41, B42, B51 and B52 are set based on the characteristics of the engine 22 and the like as the values defining allowable ranges of the detection base difference ratios J0, J1, J2, J4 and J5 during the occurrence of a misfire in the target cylinder while the exhaust gas recirculation is performed. FIG. 9 shows a relation between detection base difference ratios J0, J1, J2, J4 and J5 at every cylinder and reference values B01, B02, B11, B12, B21, B22, B41, B42, B51 and B52 when the exhaust gas recirculation is performed.

As described above, the internal combustion engine system mounted on the hybrid vehicle 20 of the embodiment makes detection on the occurrence or the non-occurrence of a misfire by comparing the 240-degree difference TD240 of the 30-degree rotation time T30 (CA) with the tentative detection reference value A1 and comparing the detection base difference ratios J1 and J5 with the ranges of the respective reference values B11, B12, B51 and B52 when the exhaust gas recirculation is performed, in addition to the methodology in the non-performance of the exhaust gas recirculation. This arrangement enables to detect a misfire in any of cylinders of the engine 22 accurately even when the exhaust gas recirculation is performed. The internal combustion engine system mounted on the hybrid vehicle 20 of the embodiment makes detection on the occurrence or the non-occurrence of a misfire by comparing the 360-degree difference TD360 with the tentative detection reference value A1 and comparing the detection base difference ratios J0, J2 and J4 with the ranges of the respective reference values B01, B02, B21, B22, B41 and B42 when the exhaust gas recirculation is not performed. This arrangement, as a matter of course, enables to detect a misfire of any of cylinders of the engine 22 accurately. The internal combustion engine system mounted on the hybrid vehicle 20 of the embodiment namely makes detection on the occurrence or the non-occurrence of a misfire of any of cylinders of the engine 22 accurately even when the exhaust gas recirculation is performed or not performed.

The internal combustion engine system mounted on the hybrid vehicle 20 of the embodiment makes detection on the occurrence or the non-occurrence of a misfire by comparing the 240-degree difference TD240 of the 30-degree rotation time T30 (CA) with the tentative detection reference value A1 and comparing the detection base difference ratios J1 and J5 with the ranges of the respective reference values B11, B12, B51 and B52 when the exhaust gas recirculation is performed, in addition to the methodology in the non-performance of the exhaust gas recirculation. The internal combustion engine system may make detection on the occurrence or the non-occurrence of a misfire by comparing a 120-degree difference TD120 of the 30-degree rotation time T30 (CA) with the tentative detection reference value A1, in place of the comparison of the 240-degree difference TD240 of the 30-degree rotation time T30 (CA) with the tentative detection reference value A1. The internal combustion engine system may make detection on the occurrence or the non-occurrence of a misfire by comparing a 120-degree difference TD120 of the 30-degree rotation time T30 (CA) with the tentative detection reference value A1, in addition to the comparison of the 240-degree difference TD240 of the 30-degree rotation time T30 (CA) with the tentative detection reference value A1.

The internal combustion engine system mounted on the hybrid vehicle 20 of the embodiment makes detection on the occurrence or the non-occurrence of a misfire by comparing the 240-degree difference TD240 of the 30-degree rotation time T30 (CA) with the tentative detection reference value A1 and comparing the detection base difference ratios J1 and J5 with the ranges of the respective reference values B11, B12, B51 and B52 when the exhaust gas recirculation is performed, in addition to the methodology in the non-performance of the exhaust gas recirculation. In the case of engine 22 having four cylinders, the internal combustion engine system may make detection on the occurrence or the non-occurrence of a misfire by comparing a 180-degree difference TD180 of the 30-degree rotation time T30 (CA) with the tentative detection reference value A1 when the exhaust gas recirculation is performed, in addition to the methodology in the non-performance of the exhaust gas recirculation. In the case of engine 22 having eight cylinders, the internal combustion engine system may make detection on the occurrence or the non-occurrence of a misfire by comparing a 270-degree difference TD270 of the 30-degree rotation time T30 (CA) with the tentative detection reference value A1, by comparing a 180-degree difference TD180 of the 30-degree rotation time T30 (CA) with the tentative detection reference value A1, by comparing a 90-degree difference TD90 of the 30-degree rotation time T30 (CA) with the tentative detection reference value A1 or the like when the exhaust gas recirculation is performed, in addition to the methodology in the non-performance of the exhaust gas recirculation.

The internal combustion engine system mounted on the hybrid vehicle 20 of the embodiment makes detection on the occurrence or the non-occurrence of a misfire using the 30-degree rotation time T30 (CA) required for a 30-degree rotation of the crankshaft 26. The 30-degree rotation time T30 (CA) is, however, not essential. The 30-degree rotation time T30 (CA) is a reciprocal of the 30-degree rotation speed N30 (CA) which is a rotation speed of the crankshaft 26 at every 30 degrees. Therefore, the internal combustion engine system may make detection on the occurrence or the non-occurrence of a misfire using the 30-degree rotation speed N30 (CA).

The internal combustion engine system mounted on the hybrid vehicle 20 of the embodiment makes detection on the occurrence or the non-occurrence of a misfire of the engine 22 on the basis of the 30-degree rotation time T30 (CA) required for a 30-degree rotation of the crankshaft 26. The 30-degree rotation time T30 (CA) is, however, not essential. The internal combustion engine system may make a detection of a misfire of the engine 22 on the basis of various time periods such as a 5-degree rotation time T5 (CA) required for a 5-degree rotation of the crankshaft 26 and a 10-degree rotation time T10 (CA) required for a 10-degree rotation of the crankshaft 26. The internal combustion engine system may make a detection of a misfire of the engine 22 on the basis of various rotation speeds such as a 5-degree rotation speed N5 (CA) which is a rotation speed of the crankshaft 26 at every 5 degrees and a 10-degree rotation speed N10 (CA) which is a rotation speed of the crankshaft 26 at every 10 degrees.

In the hybrid vehicle 20 of the embodiment, the motor MG2 is attached to the ring gear shaft 32a or the driveshaft via the reduction gear 35. The technique of the invention is also applicable to the motor MG2 directly attached to the ring gear shaft 32a, and also applicable to the motor MG2 attached to the ring gear shaft 32a via a transmission such as a two-stage, three-stage, or four-stage transmission in place of the reduction gear 35.

Figure 10:
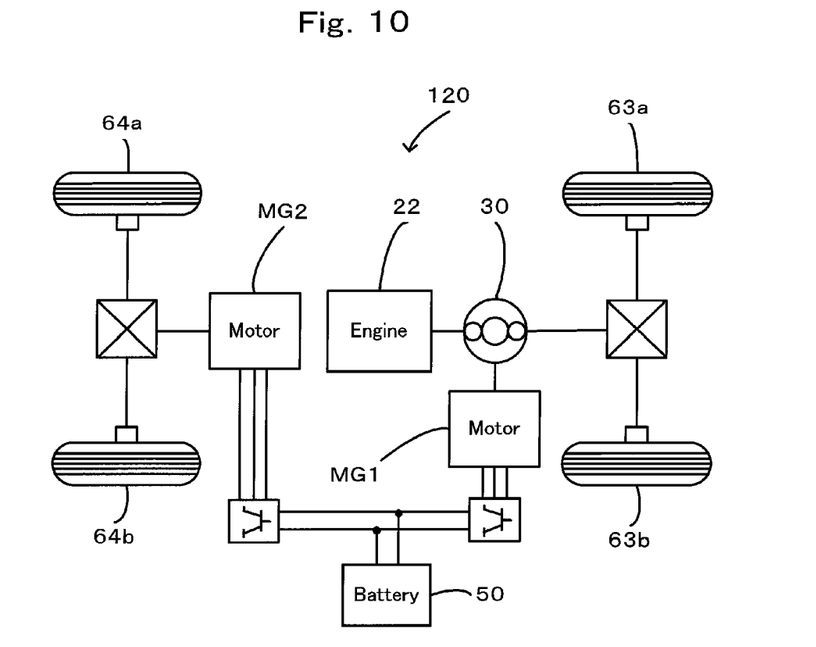
FIG. 10 schematically illustrates the configuration of another hybrid vehicle 120 in one modified example.
Figure 11:
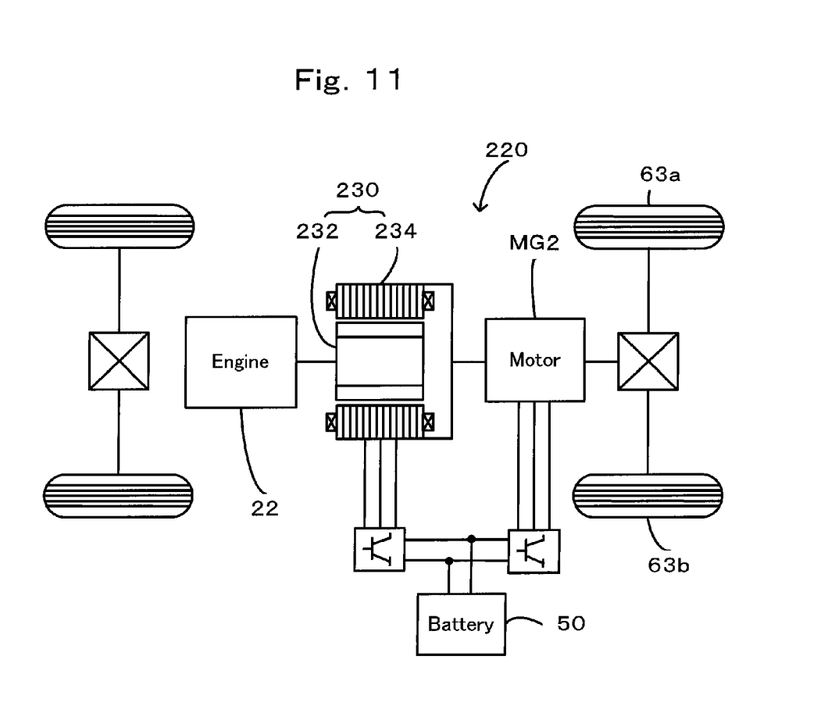
FIG. 11 schematically illustrates the configuration of still another hybrid vehicle 220 in another modified example.

The internal combustion engine system mounted on the hybrid vehicle 20 of the embodiment is constructed to detect the occurrence of a misfire of the engine 22 and includes the power distribution integration mechanism 30 connected with the crankshaft 26 of the engine 22 via the damper 28 as the distortional element and connected with the rotating shaft of the motor MG1 and the ring gear shaft 32a as the driveshaft, and the motor MG2 connected with the ring gear shaft 32a via the reduction gear 35. This configuration is, however, neither restrictive nor essential, but the internal combustion engine system of the invention may be applied to any other configuration where a crankshaft of an engine is connected to a downstream structure via a damper as a distortional element. For example, the internal combustion engine system of the invention may be adopted in a hybrid vehicle 120 of one modified structure shown in FIG. 10 to detect the occurrence of a misfire of the engine 22. In the hybrid vehicle 120 of FIG. 10, the power of the motor MG2 is output to another axle (axle linked with wheels 64a and 64b) that is different from the axle connecting with the ring gear shaft 32a (axle linked with the drive wheels 63a and 63b). In another example, the internal combustion engine system of the invention may be adopted in a hybrid vehicle 220 of another modified structure shown in FIG. 11 to detect the occurrence of a misfire of the engine 22. The hybrid vehicle 220 of FIG. 11 is equipped with a pair-rotor motor 230. The pair-rotor motor 230 includes an inner rotor 232 connected to the crankshaft 26 of the engine 22 via the damper 28 and an outer rotor 234 connected to the drive shaft arranged to output power to the drive wheels 63a and 63b. The pair-rotor motor 230 transmits part of the output power of the engine 22 to the driveshaft, while converting the residual engine output power into electric power.

The technique of the invention is not restricted to the internal combustion engine system mounted on the hybrid vehicle but may be actualized by any of other diverse applications, for example, an internal combustion engine system for an internal combustion engine mounted on a motor vehicle or another moving body or for an internal combustion engine incorporated in a construction machine or another stationary equipment, as well as an engine misfire detection method for the internal combustion engine.

The primary elements in the embodiment and its modified examples are mapped to the primary constituents in the claims of the invention as described below. The engine 22 in the embodiment corresponds to the 'internal combustion engine' in the claims of the invention. The EGR tube 152 located after the catalytic converter 134, the EGR valve 154, and the engine ECU 24 performing drive control of the EGR valve 154 in the embodiment correspond to the 'exhaust gas recirculation device' in the claims of the invention. The crank position sensor 140 constructed as an electromagnetic pickup sensor having a timing rotor 140a attached to the crankshaft 26 to be rotated in synchronism with rotation of the crankshaft 26 and designed to have teeth arranged at 10-degree intervals and two tooth-missing spaces corresponding to two teeth for specifying a reference position in the embodiment corresponds to the 'rotational position detector' in the claims of the invention. The engine ECU 24 executing the T30 computation process of FIG. 5 to compute the 30-degree rotation time T30 (CA) required for a 30-degree rotation of the crankshaft 26 based on the signals from the crank position sensor 140 in the embodiment corresponds to 'rotational fluctuation computation module' in the claims of the invention. The engine ECU 24 executing the processing of the steps S120 to S160 of FIG. 4, the EGR-off time detection process of FIG. 6, and the EGR-on time detection process of FIG. 7 in the embodiment to make detection on the occurrence or the non-occurrence of a misfire by comparing the 360-degree difference TD360 of the 30-degree rotation time T30 (CA) with the tentative reference value A1 and comparing the detection base difference ratios J0, J2 and J4 with the ranges of the respective reference values B01, B02, B21, B22, B41 and B42 when the exhaust gas recirculation is not performed, and to make detection on the occurrence or the non-occurrence of a misfire by comparing the 360-degree difference TD360 of the 30-degree rotation time T30 (CA) with the tentative reference value A1, comparing the 240-degree difference TD240 of the 30-degree rotation time T30 (CA) with the tentative detection reference value A1, and comparing the detection base difference ratios J0, J1, J2, J4 and J5 with the ranges of the respective reference values B01, B02, B11, B12, B21, B22, B41, B42, B51 and B52 when the exhaust gas recirculation is performed corresponds to the 'engine misfire detection module' in the claims of the invention. The combination of the motor MG1 with the power distribution and integration mechanism 30 in the embodiment corresponds to the 'electric power-mechanical power input output assembly' in the claims of the invention. The motor MG2 in the embodiment corresponds to the 'motor' in the claims of the invention. The motor MG1 in the embodiment corresponds to the 'generator' in the claims of the invention. The power distribution and integration mechanism 30 in the embodiment corresponds to the 'three shaft-type power input output structure' in the claims of the invention. The pair-rotor motor 230 in the modified example also corresponds to the 'electric power-mechanical power input output assembly' in the claims of the invention.

The 'internal combustion engine' is not restricted to the six-cylinder internal combustion engine designed to consume a hydrocarbon fuel, such as gasoline or light oil, and thereby output power, but may be any other type of internal combustion engine having an exhaust gas recirculation device, for example, a four-cylinder type, an eight-cylinder type, or an engine to consume hydrogen. The 'rotational position detector' is not restricted to the crank position sensor 140 constructed as an electromagnetic pickup sensor having a timing rotor 140a attached to the crankshaft 26 to be rotated in synchronism with rotation of the crankshaft 26 and designed to have teeth arranged at 10-degree intervals and two tooth-missing spaces corresponding to two teeth for specifying a reference position, but may be any other design, for example, a crank position sensor having a timing rotor designed to have teeth arranged at 1-degree intervals. The 'rotational fluctuation computation module' is not restricted to the arrangement of computing the 30-degree rotation time T30 (CA) required for a 30-degree rotation of the crankshaft 26 based on the signals from the crank position sensor 140, but may be any other arrangement of computing a rotational fluctuation of the output shaft at every specific rotational angle from the detected rotational position of the output shaft, for example, the arrangement of computing the 30-degree rotation speed N30 (CA) which is a rotation speed of the crankshaft 26 at every 30 degrees or the arrangement of computing 10-degree rotation time T10 (CA) required for a 10-degree rotation of the crankshaft 26 based on the signals from a crank position sensor having a timing rotor designed to have teeth arranged at 1-degree intervals. The 'engine misfire detection module' is not restricted to the arrangement of making detection on the occurrence or the non-occurrence of a misfire by comparing the 360-degree difference TD360 of the 30-degree rotation time T30 (CA) with the tentative reference value A1 and comparing the detection base difference ratios J0, J2 and J4 with the ranges of the respective reference values B01, B02, B21, B22, B41 and B42 when the exhaust gas recirculation is not performed, and making detection on the occurrence or the non-occurrence of a misfire by comparing the 360-degree difference TD360 of the 30-degree rotation time T30 (CA) with the tentative reference value A1, comparing the 240-degree difference TD240 of the 30-degree rotation time T30 (CA) with the tentative detection reference value A1, and comparing the detection base difference ratios J0, J1, J2, J4 and J5 with the ranges of the respective reference values B01, B02, B11, B12, B21, B22, B41, B42, B51 and B52 when the exhaust gas recirculation is performed. The 'engine misfire detection module' may be any other arrangement of making detection on occurrence or non-occurrence of a misfire in any of cylinders of the internal combustion engine based on a first angle difference that is a difference corresponding to a first preset angle of the computed rotational fluctuations when the introduction of part of exhaust into the gas intake line is not performed by the exhaust gas recirculation device, and making detection on the occurrence or the non-occurrence of a misfire in any of cylinders of the internal combustion engine based on the first angle difference and a second angle difference that is a difference corresponding to a second preset angle smaller than the first preset angle of the computed rotational fluctuations when the introduction of part of exhaust into the gas intake line is not performed by the exhaust gas recirculation device. The 'engine misfire detection module' may be, for example, the arrangement of making detection on the occurrence or the non-occurrence of a misfire by comparing a 120-degree difference TD120 of the 30-degree rotation time T30 (CA) with the tentative detection reference value A1 in place of the comparison of the 240-degree difference TD240 of the 30-degree rotation time T30 (CA) with the tentative detection reference value A1 when the exhaust gas recirculation is performed, the arrangement of making detection on the occurrence or the non-occurrence of a misfire by comparing a 120-degree difference TD120 of the 30-degree rotation time T30 (CA) with the tentative detection reference value A1 in addition to the comparison of the 240-degree difference TD240 of the 30-degree rotation time T30 (CA) with the tentative detection reference value A1 when the exhaust gas recirculation is performed, the arrangement for the engine 22 having four cylinders of making detection on the occurrence or the non-occurrence of a misfire by comparing a 180-degree difference TD180 of the 30-degree rotation time T30 (CA) with the tentative detection reference value A1 when the exhaust gas recirculation is performed in addition to the methodology in the non-performance of the exhaust gas recirculation, or the arrangement for the engine 22 having eight cylinders of making detection on the occurrence or the non-occurrence of a misfire by comparing a 270-degree difference TD270 of the 30-degree rotation time T30 (CA) with the tentative detection reference value A1, by comparing a 180-degree difference TD180 of the 30-degree rotation time T30 (CA) with the tentative detection reference value A1, by comparing a 90-degree difference TD90 of the 30-degree rotation time T30 (CA) with the tentative detection reference value A1 or the like when the exhaust gas recirculation is performed in addition to the methodology in the non-performance of the exhaust gas recirculation. The 'electric power-mechanical power input output assembly' is not restricted to the combination of the motor MG1 with the power distribution and integration mechanism 30 or the pair-rotor motor 230, but may be any assembly connected with the output shaft of the internal combustion engine via the torsion element and with the drive shaft and configured to input and output power to and from the output shaft and the drive shaft through input and output of electric power and mechanical power. The 'motor' is not restricted to the motor MG2 constructed as a synchronous motor generator, but may be any type of motor constructed to input and output power to and from the drive shaft, for example, an induction motor. The 'generator' is not restricted to the motor MG1 constructed as a synchronous motor generator, but may be any type of generator constructed to input and output power, for example, an induction motor. The 'three shaft-type power input output structure' is not restricted to the power distribution integration mechanism 30, but may be any structure connected to three shafts, the output shaft of the internal combustion engine, the drive shaft, and a rotating shaft of the generator, and designed to input and output power to residual shaft based on powers input from and output to any two shafts among the three shafts, for example, a structure adopting a double pinion-type planetary gear mechanism, a structure connected to four or a greater number of shafts by combination of multiple planetary gear mechanisms, or a structure adopting a differential gear or another differential motion mechanism other than the planetary gear mechanism.

The above mapping of the primary elements in the embodiment and its modified examples to the primary constituents in the claims of the invention is not restrictive in any sense but is only illustrative for concretely describing the modes of carrying out the invention. Namely the embodiment and its modified examples discussed above are to be considered in all aspects as illustrative and not restrictive.

There may be many modifications, changes, and alterations without departing from the scope or spirit of the main characteristics of the present invention.

INDUSTRIAL APPLICABILITY

The technique of the invention is preferably applied to the manufacturing industries of internal combustion engine systems as well as vehicles equipped with them.

The invention claimed is:

1. An internal combustion engine system having a multi-cylinder internal combustion engine that is connected to a drive shaft via a torsion element and includes an exhaust gas recirculation device which performs introduction of part of the exhaust into a gas intake line, the internal combustion engine system comprising:
   a rotational position detector that detects a rotational position of an output shaft of the internal combustion engine;
   a rotational fluctuation computation module that computes a rotational fluctuation of the output shaft at every specific rotational angle from the detected rotational position of the output shaft; and
   an engine misfire detection module that makes detection on occurrence or non-occurrence of a misfire in any of the cylinders of the internal combustion engine based on a first angle difference that is a difference corresponding to a first preset angle of the computed rotational fluctuations when the introduction of part of the exhaust into the gas intake line is not performed by the exhaust gas recirculation device, and makes detection on the occurrence or the non-occurrence of a misfire in any of the cylinders of the internal combustion engine based on the first angle difference and a second angle difference that is a difference corresponding to a second preset angle smaller than the first preset angle of the computed rotational fluctuations when the introduction of part of the exhaust into the gas intake line is performed by the exhaust gas recirculation device.

2. The internal combustion engine system in accordance with claim 1, wherein the first preset angle is 360 degrees and the second preset angle is an angle which is an integral multiple of 720 degrees divided by the number of cylinders of the internal combustion engine.

3. The internal combustion engine system in accordance with claim 2, wherein the second preset angle is the closest angle to 360 degrees among integral multiples of 720 degrees divided by the number of cylinders of the internal combustion engine.

4. The internal combustion engine system in accordance with claim 1, wherein the engine misfire detection module makes detection on occurrence or non-occurrence of a misfire in a misfire target cylinder, that is a target cylinder for the misfire, of the internal combustion engine based on respective ratios of rotational fluctuations of a cylinder combusted 360 degrees before the misfire target cylinder, a cylinder combusted immediately before the misfire target cylinder, and a cylinder combusted immediately after the misfire target cylinder to a rotational fluctuation of the misfire target cylinder, when the introduction of part of the exhaust into the gas intake line is not performed,
   and makes detection on the occurrence or the non-occurrence of a misfire in the misfire target cylinder based on respective ratios of rotational fluctuations of the cylinder combusted 360 degrees before the misfire target cylinder, two cylinders consecutively combusted immediately before the misfire target cylinder, and two cylinders consecutively combusted immediately after the misfire target cylinder to a rotational fluctuation of the misfire target cylinder, when the introduction of part of the exhaust into the gas intake line is performed.

5. The internal combustion engine system in accordance with claim 1, wherein the rotational fluctuation computation module computes a unit rotational angle rotation time, as the rotational fluctuation, that is a time required for rotation of the output shaft of the internal combustion engine by the specific rotational angle every time the output shaft rotates by the specific rotational angle.

6. The internal combustion engine system in accordance with claim 1, the internal combustion engine system further comprising:
   an electric power-mechanical power input/output assembly connected with the output shaft of the internal combustion engine via the torsion element and with the drive shaft and configured to input and output power to and from the output shaft and the drive shaft through input and output of electric power and mechanical power; and
   a motor constructed to input and output power to and from the drive shaft.

7. The internal combustion engine system in accordance with claim 6, wherein the electric power-mechanical power input and output assembly has:
   a generator constructed to input and output power; and
   a three shaft-type power input/output structure connected to three shafts, the output shaft of the internal combustion engine, the drive shaft, and a rotating shaft of the generator, and designed to input and output power to residual shaft based on powers input from and output to any two shafts among the three shafts.

8. A vehicle, having the internal combustion engine system in accordance with claim 1 as a power source, wherein an axle of the vehicle is linked to the drive shaft.

9. An engine misfire detection method of detecting a misfire of a multi-cylinder internal combustion engine in an internal combustion engine system, the internal combustion engine is connected to a drive shaft via a torsion element and includes an exhaust gas recirculation device which performs introduction of part of the exhaust into a gas intake line,
   the engine misfire detection method comprising:
   (a) computing a rotational fluctuation of an output shaft of the internal combustion engine at every specific rotational angle from a rotational position of the output shaft; and
   (b) making detection on occurrence or non-occurrence of a misfire in any of the cylinders of the internal combustion engine based on a first angle difference that is a difference corresponding to a first preset angle of the computed rotational fluctuations when the introduction of part of the exhaust into the gas intake line is not performed by the exhaust gas recirculation device, and making detection on the occurrence or the non-occurrence of a misfire in any of the cylinders of the internal combustion engine based on the first angle difference and a second angle difference that is a difference corresponding to a second preset angle smaller than the first preset angle of the computed rotational fluctuations when the introduction of part of the exhaust into the gas intake line is performed by the exhaust gas recirculation device.

10. The engine misfire detection method in accordance with claim 9, wherein the step (b) makes detection on occurrence or non-occurrence of a misfire in a misfire target cylinder, that is a target cylinder for the misfire, of the internal combustion engine based on respective ratios of rotational fluctuations of a cylinder combusted 360 degrees before the misfire target cylinder, a cylinder combusted immediately before the misfire target cylinder, and a cylinder combusted immediately after the misfire target cylinder to a rotational fluctuation of the misfire target cylinder, when the introduction of part of the exhaust into the gas intake line is not performed,
   and makes detection of the occurrence or the non-occurrence of a misfire in the misfire target cylinder based on respective ratios of rotational fluctuations of the cylinder combusted 360 degrees before the misfire target cylinder, two cylinders consecutively combusted immediately before the misfire target cylinder, and two cylinders consecutively combusted immediately after the misfire target cylinder to a rotational fluctuation of the misfire target cylinder, when the introduction of part of the exhaust into the gas intake line is performed.

* * * * *